United States Patent
Northcott et al.

(10) Patent No.: US 8,025,399 B2
(45) Date of Patent: Sep. 27, 2011

(54) COMBINED IRIS IMAGER AND WAVEFRONT SENSOR

(75) Inventors: Malcolm J. Northcott, Felton, CA (US); J. Elon Graves, Los Gatos, CA (US)

(73) Assignee: AOptix Technologies, Inc., Campbell, CA (US)

( * ) Notice: Subject to any disclaimer, the term of this patent is extended or adjusted under 35 U.S.C. 154(b) by 913 days.

(21) Appl. No.: 12/021,175

(22) Filed: Jan. 28, 2008

(65) Prior Publication Data
US 2009/0046899 A1    Feb. 19, 2009

Related U.S. Application Data

(60) Provisional application No. 60/886,890, filed on Jan. 26, 2007.

(51) Int. Cl.
*A61B 3/00* (2006.01)
(52) U.S. Cl. ...................................................... 351/200
(58) Field of Classification Search ............... 382/117
See application file for complete search history.

(56) References Cited

U.S. PATENT DOCUMENTS

| | | | |
|---|---|---|---|
| 4,106,856 A | 8/1978 | Babish | |
| 5,098,426 A * | 3/1992 | Sklar et al. | 606/5 |
| 5,214,455 A * | 5/1993 | Penney et al. | 351/210 |
| 5,262,871 A * | 11/1993 | Wilder et al. | 348/307 |
| D389,723 S * | 1/1998 | Godard et al. | D8/320 |
| 5,956,122 A | 9/1999 | Doster | |
| 6,055,322 A * | 4/2000 | Salganicoff et al. | 382/117 |
| 6,059,773 A | 5/2000 | Maloney et al. | |
| 6,139,145 A * | 10/2000 | Israel | 351/160 R |
| 6,333,988 B1 | 12/2001 | Seal et al. | |
| 6,447,119 B1 | 9/2002 | Stewart et al. | |
| 6,547,395 B1 * | 4/2003 | Neal et al. | 351/246 |
| 6,609,794 B2 * | 8/2003 | Levine | 351/221 |
| 6,714,665 B1 | 3/2004 | Hanna et al. | |
| 6,785,406 B1 * | 8/2004 | Kamada | 382/117 |
| 7,075,553 B2 * | 7/2006 | Miller et al. | 345/598 |
| 7,111,938 B2 * | 9/2006 | Andino et al. | 351/212 |
| 7,146,983 B1 * | 12/2006 | Hohla et al. | 128/898 |
| 7,237,898 B1 * | 7/2007 | Hohla et al. | 351/246 |
| 7,248,720 B2 * | 7/2007 | Muller et al. | 382/117 |
| 7,268,937 B1 * | 9/2007 | Andersen et al. | 359/359 |

(Continued)

OTHER PUBLICATIONS

PCT International Search Report and Written Opinion, PCT/US2008/052213, Jun. 2, 2008, 7 Pages.

*Primary Examiner* — Sath V Perungavoor
(74) *Attorney, Agent, or Firm* — Fenwick & West LLP

(57) ABSTRACT

An iris imaging system used for biometric identification provides a combined iris imager and wavefront sensor. The detector array allows for independent readout of different regions, such that a wavefront sensor region can be read out fast while allowing signal to integrate on the iris imaging region. Alternatively, the entire array may be used for wavefront sensing during an acquisition phase, and then at least a portion of the array may be switched to be used for iris imaging during a subsequent imaging phase. An optical periscope optionally allows various optics to be inserted in front of the combined iris imager and wavefront sensor. In another embodiment, the glint image of an on-axis or near on-axis illumination source is picked off at the image plane and directed to the wavefront sensor optics, while allowing all of the light from the iris field to pass through to the iris imaging camera.

13 Claims, 5 Drawing Sheets

U.S. PATENT DOCUMENTS

| | | |
|---|---|---|
| 7,280,676 B2 | 10/2007 | Miura et al. |
| 7,280,678 B2 | 10/2007 | Haven et al. |
| 7,408,572 B2 * | 8/2008 | Baxter et al. ............. 348/208.14 |
| 7,418,115 B2 * | 8/2008 | Northcott et al. ............. 382/117 |
| 7,428,320 B2 * | 9/2008 | Northcott et al. ............. 382/117 |
| 7,458,683 B2 * | 12/2008 | Chernyak ...................... 351/205 |
| 7,766,903 B2 * | 8/2010 | Blumenkranz et al. ........... 606/4 |
| 2002/0093645 A1 * | 7/2002 | Heacock ...................... 356/138 |
| 2002/0097375 A1 * | 7/2002 | Watson et al. ................. 351/200 |
| 2002/0161356 A1 * | 10/2002 | Bille et al. ........................ 606/4 |
| 2003/0020872 A1 * | 1/2003 | Liang et al. ................... 351/200 |
| 2003/0025877 A1 | 2/2003 | Yancey et al. |
| 2003/0163122 A1 * | 8/2003 | Sumiya ............................. 606/5 |
| 2003/0169334 A1 | 9/2003 | Braithwaite et al. |
| 2003/0174281 A1 * | 9/2003 | Herekar et al. ............... 351/200 |
| 2004/0145702 A1 * | 7/2004 | Liang ............................ 351/200 |
| 2004/0165147 A1 | 8/2004 | Della Vecchia et al. |
| 2004/0169817 A1 * | 9/2004 | Grotehusmann et al. ...... 351/204 |
| 2005/0007603 A1 * | 1/2005 | Arieli et al. .................... 356/601 |
| 2005/0185138 A1 * | 8/2005 | Wong et al. .................... 351/246 |
| 2006/0092376 A1 | 5/2006 | Baek et al. |
| 2006/0098097 A1 | 5/2006 | Wach et al. |
| 2006/0140454 A1 * | 6/2006 | Northcott et al. ............. 382/117 |
| 2007/0055222 A1 * | 3/2007 | Hohla et al. ..................... 606/12 |
| 2008/0002863 A1 * | 1/2008 | Northcott et al. ............. 382/117 |
| 2008/0123053 A1 | 5/2008 | Mihashi et al. |
| 2009/0046899 A1 * | 2/2009 | Northcott et al. ............. 382/117 |
| 2009/0099558 A1 * | 4/2009 | Wong et al. ....................... 606/5 |
| 2010/0188483 A1 * | 7/2010 | Berger ............................ 348/46 |

* cited by examiner

COMBINED IRIS IMAGER AND WAVEFRONT SENSOR

CROSS-REFERENCE TO RELATED APPLICATION(S)

This application claims priority from U.S. Provisional Patent Application Ser. No. 60/886,890, filed Jan. 26, 2007, entitled "Combined Iris Imager and Wavefront Sensor." This application is related to U.S. patent application Ser. No. 11/765,401, filed Jun. 19, 2007, entitled "Iris Imaging Using Reflection From The Eye," and U.S. patent application Ser. No. 11/297,578, filed on Dec. 7, 2005, entitled "Iris Imaging Using Reflection From The Eye." The subject matter of all of the foregoing is incorporated herein by reference in their entirety.

BACKGROUND OF THE INVENTION

1. Field of the Invention

This invention relates to iris imaging, as may be used for biometric identification.

2. Description of the Related Art

A biometric iris imaging sensor can rapidly deliver more consistently high quality images by incorporating tip-tilt (tracking) and focus correction. At very long standoff distances, or under adverse conditions, some higher order aberration correction may also be performed. Deriving the signal to control tip-tilt and focus requires some sort of wavefront sensor ("WFS"). Sensing higher order aberrations puts more demands on the wavefront sensor and restricts design choices.

The traditional approach to wavefront sensing in these sorts of imaging applications is to carry out contrast sensing on the image to determine focus, and correlation tracking to determine tip-tilt. This approach is typically quite slow, and requires a strong signal to noise ratio for the image, which may be difficult to obtain using short exposures. The effectiveness of such techniques also depends on the contrast of the underlying image. Obtaining higher order wavefront signals from analysis of an unknown image is difficult, and requires very high signal to noise data.

In the case of biometric iris imaging we can arrange the illumination sources such that a strong glint can be produced on the surface of the cornea, and/or a strong retinal retro-reflection can be produced. In the case of the glint, the image is a diffraction-limited, or near diffraction-limited point source. By using on-axis or nearly on-axis illumination, the glint image of the illumination source appears near the center of the pupil. The glint image is produced by specular reflection from the surface of the cornea which largely maintains polarization. Due to the extreme curvature of the cornea, the glint image of the source is highly de-magnified, and will appear as a very compact or even diffraction limited source. In the case of the retinal retro-reflection the sharp edge of the iris border provides a near diffraction limited edge, which guarantees that high spatial frequency information can be measured. Both of these sources make excellent input to a wavefront sensor because they are compact with predictable high frequency contents.

SUMMARY OF THE INVENTION

The present invention provides an iris imaging system for biometric identification having a combined iris imager and wavefront sensor. In one embodiment, the same detector array can be used for both iris imaging and wavefront sensing at the image plane. The detector allows for independent readout of different regions, such that the WFS region can be read out fast while allowing signal to integrate on the iris imaging portions of the detector array. Alternatively, the entire array may be used for wavefront sensing during an acquisition phase, and then a portion of the array may be switched to be used for iris imaging during a subsequent imaging phase. A single detector may also switch between wavefront sensing mode and imaging mode, so that image quality can be maximized before each image capture exposure.

In one embodiment, an optical periscope allows various optics to be inserted in front of the iris imager and wavefront sensor in order to realize some forms of WFS functionality. Examples of the optics that may be inserted via the optical periscope include a curvature sensor or phase diversity sensor using a birefringent lens, and a beam splitter arrangement to achieve a curvature sensor or phase diversity sensor by forming two adjacent images of different focus. Other forms of WFS can also be implemented using the periscope technique. In addition, a simple phase diversity sensor can be built by inserting a known additional phase aberration in the glint path. For detection of the simple aberrations of tip-tilt and focus, no additional optics is required, since these aberrations may easily be measured in the image plane. The ability to independently read out the WFS section of the array at high frame rates is very useful. In principle higher order aberrations can also be detected in the image plane, but the processing requirements are significant.

In another embodiment, the glint image of an on-axis or near on-axis illumination source is reflected from the central portion of the pupil of the eye so as to be spatially isolated in the image plane. The glint light from the pupil field is picked off at the image plane and directed to the wavefront sensor optics, while allowing all of the light from the iris field to pass through to the iris imaging camera. This arrangement may use separate image and WFS detectors, but the WFS pickoff is performed efficiently in or near the image plane.

Other aspects of the invention include methods corresponding to the devices and systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

Figure 1:
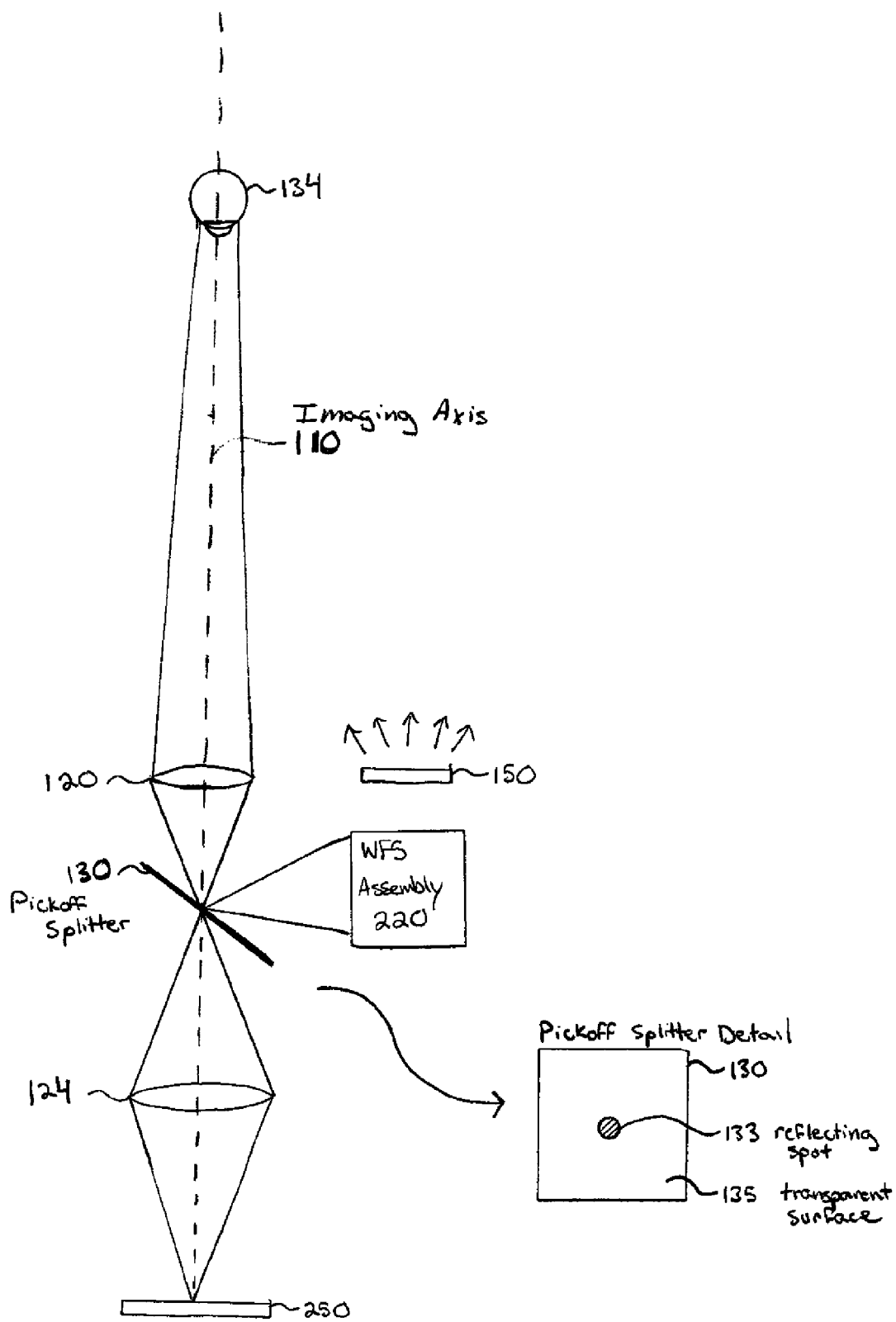
FIG. 1 is an illustration of an iris imaging system using a pickoff splitter to direct a glint image to a wavefront sensor assembly, in accordance with one embodiment of the invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Traditionally, it has been thought that a large angle between the illumination direction and the optical axis of the iris imaging camera is necessary to improve the contrast of images. This was assumed to be due to the three-dimensional structure of the iris. However, experiments conducted by the inventors have shown that the iris image contrast is not significantly reduced by using on-axis or near on-axis illumination.

An advantage of on-axis or near on-axis illumination is that the camera and illuminator can be housed in a single package, which makes deployment of the system much easier and its use more convenient. A further benefit of on-axis or near on-axis illumination is that the glint from the iris illuminator source will be positioned within the eye pupil, and will not contaminate the area of the iris image available for coding.

As has been described in U.S. patent application Ser. No. 11/765,401, filed Jun. 19, 2007, entitled "Iris Imaging Using Reflection From The Eye," which has been incorporated herein by reference, the term "wavefront sensing" includes determination of not only tip-tilt or location, but also includes focus, and potentially sensing of higher order aberrations. As has also been described therein, both the corneal glint return and the retinal retro-reflection (redeye return) can be used for wavefront sensing, and ultimately for deriving a signal used for drive an adaptive optics loop. It is also possible to use more general image structure to derive wavefront estimates, though the processing involved is significantly more complex, and the results are typically less reliable. In one embodiment, if a retro-reflection signal is used, the retro-reflection return is enhanced by positioning the illumination source as close to on-axis as possible. The brightness of the eye pupil may be controlled by changing the distance from the illumination source to the objective lens of the camera. A short distance results in a bright pupil return and a long distance results in a very small pupil return. In another embodiment, if a glint return is used, then moving the illumination source off-axis reduces confusion caused by the retro-reflection return by reducing its level.

In the case of glint reflection, the specular reflection from the curved cornea surface produces a virtual image of the illumination source. This virtual image is highly de-magnified, which allows even a relatively large illumination source to appear diffraction limited. The virtual image also appears very close to the eye pupil plane, and is therefore close to optimal for imaging the iris structure in some embodiments.

Many types of wavefront sensors can be used for sensing the wavefront from a glint source, and ultimately for deriving a tip-tilt and/or focus and/or higher order correction for an adaptive optics system. Since the glint is a specular reflection, it is even possible to use an interferometric wavefront sensor. The glint reflection also preserves polarization to a high degree, allowing a polarized light source to be used to enhance the glint contrast, pick off glint light, or enhance the use of polarization in the wavefront sensor. Examples of non-interferometric wavefront sensors that may be used include curvature sensors; Shack Hartmann sensors; pyramid sensors; dithering controller; quad cell or any other type of position sensor; phase diversity sensors; and any other type of high order or low order wavefront sensor. Any of these wavefront sensors can be used with glint light that is separated by a beam splitter, a spatial filter, an optical periscope, a polarizing filter, or a dichroic mirror. If an optical periscope is used, or a simple in-line WFS optic, a single sensor can perform both as the iris imager and as the wavefront sensor as described in the following.

FIG. 1 illustrates an iris imaging system using a pickoff splitter 130 to pick off the glint image and direct it to a wavefront sensor assembly 220 while the light from the iris field passes through to an image sensor 250. Light from near on-axis illumination source 150 illuminates target eye 134. In one embodiment, because the illumination source 150 is near on-axis or on-axis with respect to the imaging axis 110, the glint reflection is likely to occur within the pupil of the eye 134, thus avoiding obscuring a portion of the iris. Light reflected from the eye passes through imaging lens 120 to pickoff splitter 130. As shown in the pickoff splitter detail in FIG. 1, the pickoff splitter 130 comprises a reflecting spot 133 surrounded by a transparent surface. In one embodiment, the reflecting spot is large enough to ensure that the glint will be captured, but small enough that it will not cover any of the iris image. For example, the reflecting spot may be on the order of 3 to 5 mm in diameter. The sizing may place limits on the subject eye gaze angle, since an off-axis gaze will shift the relative positions of the iris and the glint. The sizing of the spot also constrains the maximum separation of the illuminator and the camera objective. The pickoff splitter 130 is placed near the focal plane so that the glint light is spatially isolated. The reflecting spot 133 reflects the glint light to the wavefront sensor assembly 220. This glint light is well-suited for wavefront sensing using a wavefront sensor of the types listed above, and for driving any type of adaptive optics loop known to those of skill in the art. The light that encounters the transparent surface 135 of the pickoff splitter 130 passes through the pickoff splitter 130 to re-imaging lens 124. The re-imaging lens 124 focuses the remaining light reflected from the eye 134 onto an image sensor 250. The pickoff can also be accomplished by a dichroic, a polarizing beam splitter, or a neutral beam splitter as described in U.S. patent application Ser. No. 11/765,401, filed Jun. 19, 2007, entitled "Iris Imaging Using Reflection From The Eye," which has been incorporated by reference.

In one embodiment, initial targeting of the iris imaging system is accurate enough to place the glint image on or near the reflecting spot 133. Systems and methods of initial targeting of the iris imaging system have been described in U.S. patent application Ser. No. 11/765,401, filed Jun. 19, 2007, entitled "Iris Imaging Using Reflection From The Eye," and U.S. patent application Ser. No. 11/297,578, filed on Dec. 7, 2005, entitled "Iris Imaging Using Reflection From The Eye," both of which have been incorporated by reference. Feedback from the iris imaging sensor 250 can also be used to position the glint over the reflecting spot.

Figure 2:
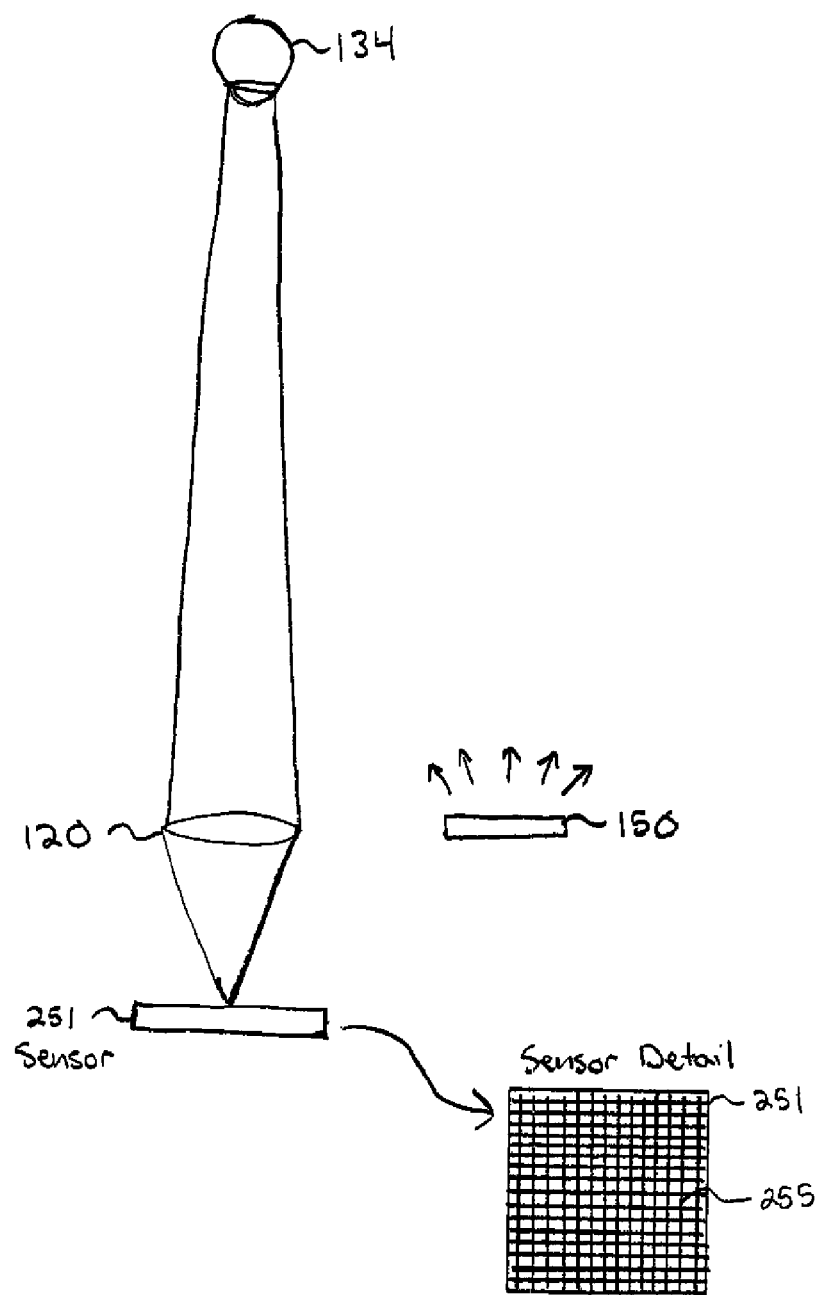
FIG. 2 is an illustration of an iris imaging system having a sensor that operates as both an iris imager and a wavefront sensor, in accordance with one embodiment of the invention.

FIG. 2 illustrates an iris imaging system having a sensor 251 that operates as both an iris imager and a wavefront sensor. Light from illumination source 150 is reflected from eye 134 and is imaged by imaging lens 120 onto sensor 251. In one embodiment, sensor 251 comprises a detector chip that allows random addressability of pixels, or allows readout of multiple windows with different integration times. In a typical implementation, the iris imager may have a VGA resolution of 640×480 pixels, but the designated WFS sub-array might comprise a 40×40 pixel square sub-array, or a 20 pixel radius circular array, for example. The sub-array readout can be performed using addressable pixels, using a separate readout logic for a sub-array region, using a non-destructive read of pixels, using overlapping pixel sets to perform an interlaced read, using comparator based pixel readout, or using any other method that allows one region to be read without significantly affecting the SNR of the readout of other regions. An advantage of systems with sensors 251 that operate as both an iris imager and a wavefront sensor is a reduction in the amount of electronics, and in some case, a reduction in the amount of optics.

In one implementation, a portion of the sensor 251 is devoted to wavefront sensing, and the remainder of the sensor 251 is devoted to iris imaging. The glint reflection from the eye is directed onto the portion of the sensor 251 devoted to wavefront sensing, for example the central portion, and the light from the iris field is directed to the remainder of the sensor 251. In this implementation, the field of view of the wavefront sensor must be small so that it does not interfere with the iris imaging function. This means that that initial acquisition/targeting system must be accurate enough to place the glint within the wavefront sensor field of view. In some implementations, the WFS region may have a variable position, so that a range of iris image positions on the imager may be accommodated. Also, in one embodiment, the initial focus is good enough to ensure that the glint image is not larger than the wavefront sensor field of view.

In an alternate implementation, the entire sensor 251 or substantially the entire sensor 251 is used during an initial acquisition phase as a wavefront sensor. During this initial acquisition phase, the sensor 251 is used to track tip-tilt and focus and establish an initial tip-tilt and focus position. This may cause a somewhat slower operation during this phase due to the time needed to read and process a large number of pixels 255 of the entire sensor 251. Once initial tip-tilt and focus positions are established based on the sensed wavefront, a subsequent imaging phase may be entered wherein the majority of the pixels 255 of sensor 251 is switched over to the iris imaging function, and a much smaller portion of the sensor 251 is maintained for wavefront sensing, thus increasing the speed of the tracking of tip-tilt and focus. In such a sensor 251, the portion of the array that is used for wavefront sensing is read out very rapidly, while the remainder of the array integrates the iris image over a longer period of time. A typical operation scenario would have the iris image read out at video rates (60 frames per second), with the WFS read out at ten times that speed.

Figure 6:
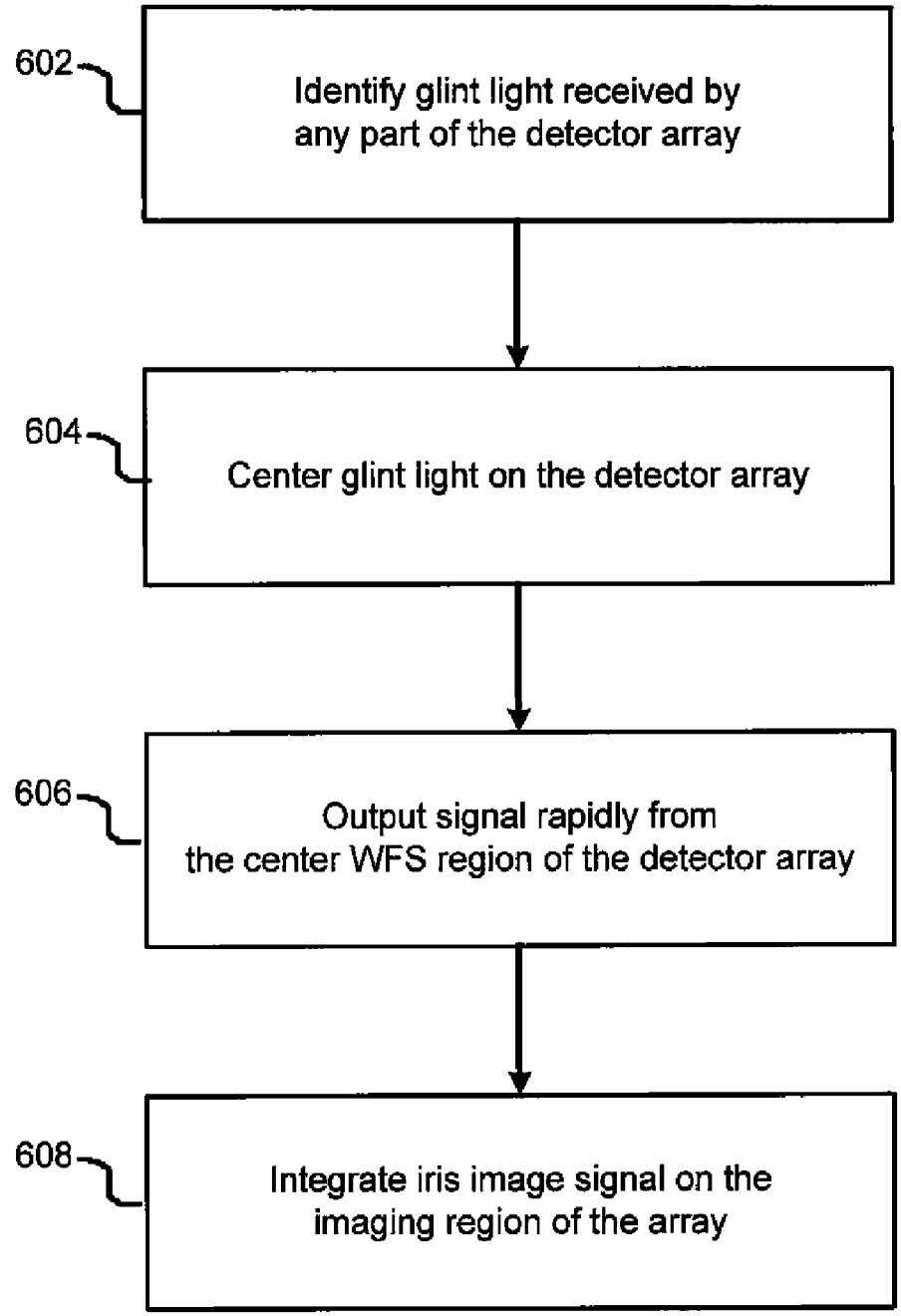
FIG. 6 is flowchart illustrating a method of performing wavefront sensing and iris imaging using a single detector array, in accordance with an embodiment of the invention.

FIG. 6 is flowchart illustrating a method 600 of performing wavefront sensing and iris imaging using a single detector array, in accordance with an embodiment of the invention. Before the method 600 begins, the iris imaging system is positioned with enough accuracy such that the glint light reflected from the target eye 134 is received by the detector array, also referred to herein as sensor 251. Then, the glint light received by any part of the detector array is identified 602. During this phase, the entire detector array acts as a wavefront sensor. Using feedback from the detector array, the glint light is centered 604 on the detector array, for example by making tip-tilt tracking corrections. Provided that the glint light is reflected from the target eye's pupil, the centering of the glint light on the detector array also centers the target eye's iris for imaging by the detector array. At this point, signal can be rapidly output 606 from a center wavefront sensor region of the detector array. Rapid readout of the wavefront sensing pixels ultimately allows for faster tip-tilt and/or focus correction because the signal derived from this readout can be used to drive an associated adaptive optics loop. While the signal from the wavefront sensing region of the detector array is output rapidly, the iris image signal on the imaging region of the array is integrated 608 to provide higher quality images.

For an inexpensive device where the subject can be assumed to be relatively still, it may be acceptable to perform fast tip-tilt and focus correction using substantially the whole array, then switch substantially the whole array to iris imaging mode. In iris imaging mode, no correction updates are made. For a device of this type, several iris images are obtained in quick succession. Typically the imager device or at least a portion thereof can be used in WFS mode to correct tip-tilt and focus aberrations between each iris image. Software can then be used to select the best images for further processing.

Figure 3:
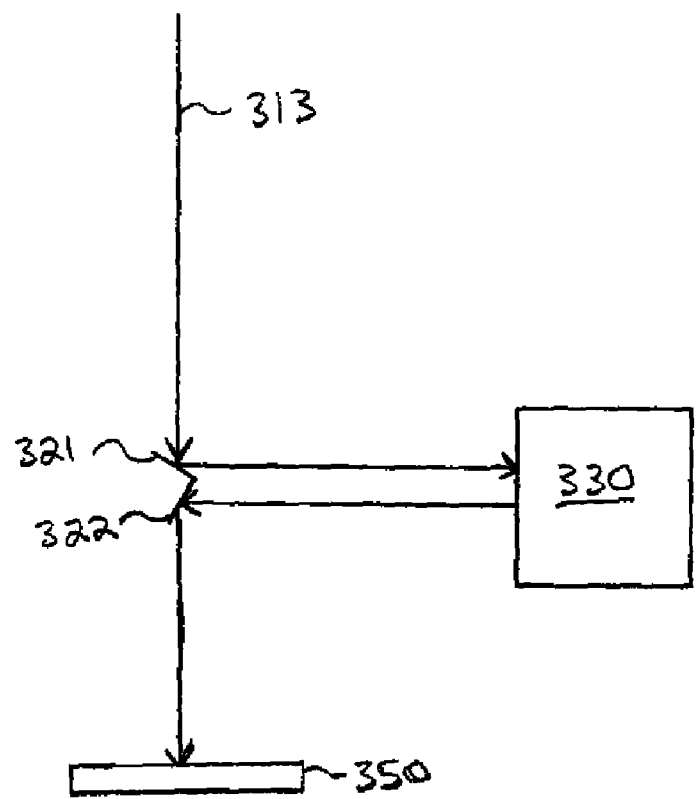
FIG. 3 is an illustration of an optical periscope in an iris imaging system that allows various optics to be inserted in front of a combined iris imager and wavefront sensor, in accordance with one embodiment of the invention.

FIG. 3 illustrates an optical periscope to allow various optics to be inserted in front of the iris imager and wavefront sensor. As shown in FIG. 3, the chief ray from the glint image 313 from the eye reflects from optical element 321 positioned near the image plane, such as a mirror, prism or other optical element to reflect the glint light to the wavefront sensor optics 330. The wavefront sensor optics then delivers the beam back to the combined iris imager and wavefront sensor 350 via optical element 322, such as a mirror, prism, or other optical element. In one embodiment, the wavefront sensor optics 330 comprises a beam splitter and lens which allows for mixing of a reference beam to build an interferometric sensor. In other embodiments, the wavefront sensor optics 330 comprise the components of a curvature sensor, a Shack Hartmann sensor, a pyramid sensor, a dithering controller, a quad cell or any other type of position sensor, a phase diversity sensor, or any other type of high order or low order wavefront sensor. This mechanism allows great freedom to implement diverse WFS techniques, at the expense of needing additional optics.

Figure 4:
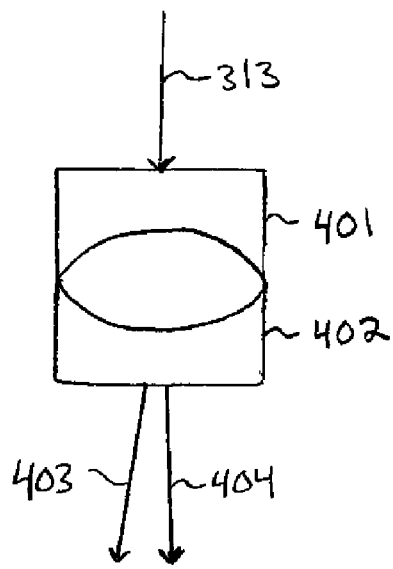
FIG. 4 is an illustration of an embodiment of wavefront sensor optics comprising a birefringent lens to be inserted in front of a combined iris imager and wavefront sensor, in accordance with one embodiment of the invention.

FIG. 4 illustrates an example of the wavefront sensor optics 330 that may be used in-line or inserted via the optical periscope described with respect to FIG. 3. The optics comprise a curvature sensor or phase diversity sensor using birefringent lens. The chief ray from the glint image 313 passes through a lens component 401 fabricated form calcite or other birefringent material, and then through a lens component 402 fabricated from BK7 or other isotropic optical material. Rays 403 and 404 represent the chief rays for the ordinary and extraordinary images formed by the birefringent lens. Thus, the birefringent lens forms two images of the glint with slightly different focus, which can be used for wavefront sensing by the combined iris imager and wavefront sensor 350.

Figure 5:
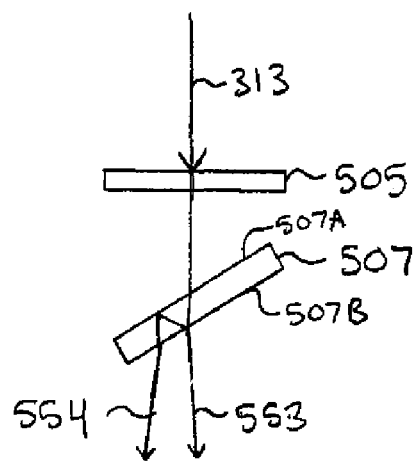
FIG. 5 is an illustration of a beam splitter arrangement to achieve two adjacent images of different focus to be imaged onto a combined iris imager and wavefront sensor, in accordance with an embodiment of the invention.

FIG. 5 illustrates an example beam splitter arrangement to achieve a similar curvature sensor or phase diversity sensor by forming two adjacent images of different focus position. This arrangement is another example of the wavefront sensor optics 330 that may be inserted via the optical periscope described with respect to FIG. 3, or may be used in-line without the need for the periscope arrangement. As shown in FIG. 5, the chief ray from the glint image 313 passes through a polarizer 505. Polarizer 505 may not be needed in implementations where the input light is already polarized. Since the glint reflection maintains polarization, a polarized light source will give a polarized glint return. After passing through polarizer 505, the light is directed to a quarter wave plate 507 positioned at a 45 degree incident angle. The quarter wave plate 507 has two parallel sides, referred to as side 507A and 507B. The side of the quarter wave plate 507 that is further from the polarizer 505, referred to as side 507B, is a neutral beam splitter which allows approximately 50% of the light though. The side of the quarter wave plate 507 closer to the polarizer 505, referred to as side 507A, is fabricated as a polarizing beam splitter which reflects light that is polarized orthogonally to the polarization of polarizer 505 and passes light that has the same polarization as the polarizer 505. Light reaching side 507B, the neutral beam splitter of quarter wave plate 507, after traversing the plate is circularly polarized. Approximately half of this light flows through towards the combined iris imager and wavefront sensor 350 as image ray 553. The other half of this light is reflected and has its polarization rotated by 90 degrees, and thus reflects off the side 507A of the quarter wave plate 507, before exiting as image ray 554. On a second pass of the system the light polarization is again rotated through 90 degrees, and thus passes though 507A and is lost. Thus, image rays 553 and 554 emerge from quarter wave plate 507. Image ray 553 contains approximately 50% of the glint light, whereas image ray 554 contains approximately 25% of the glint light. Each image ray 553, 554 forms an image, and the two images have different focus. These two images may be used in a phase diversity type phase retrieval algorithm, for example. Other optical arrangements can perform a similar function, though possibly with reduced efficiency.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An iris imaging system for biometric identification, the system comprising:
   an optical detector array positioned at an image plane of the iris imaging system, the detector array having a first and second non-overlapping regions, the first region receiving glint light reflected from a target eye and the second region receiving an image of the iris of the target eye; wherein the first region senses a wavefront of the glint light reflected from the target eye and the second region images the iris of the target eye.

2. The iris imaging system of claim 1, wherein a signal output from the first region determines a tip-tilt correction for the iris imaging system.

3. The iris imaging system of claim 1, wherein a signal output from the first region determines a focus correction for the iris imaging system.

4. The iris imaging system of claim 1, wherein the detector array allows for independent readout of the first and second regions, and the first region is read out more rapidly than the second region.

5. The iris imaging system of claim 1, further comprising an optical periscope positioned in front of the detector array; the optical periscope comprising:
   a first optical element to direct glint light from the target eye; and
   wavefront sensor optics to receive the glint light directed by the first optical element and to redirect the glint light to the detector array via a second optical element.

6. The iris imaging system of claim 5, wherein the wavefront sensor optics comprise a birefringent lens.

7. The iris imaging system of claim 5, wherein the wavefront sensor optics comprise a beam splitter arrangement that forms two adjacent images of different focus.

8. A method of imaging an iris of an eye using an iris imaging system:
   sensing a wavefront of light reflected from the eye using substantially all of a detector array;
   establishing an initial tip-tilt and focus position for the iris imaging system based on the sensed wavefront;
   switching a majority of the detector array from wavefront sensing to iris imaging while maintaining a non-overlapping portion of the detector array for wavefront sensing; and
   imaging the iris with the majority of the detector array.

9. The method of claim 8, wherein sensing a wavefront of light reflected from the eye comprises identifying glint light received by any part of the detector array.

10. The method of claim 8, wherein establishing an initial tip-tilt and focus position for the iris imaging system comprises centering a glint reflection from the eye on the detector array.

11. The method of claim 8, wherein the portion of the detector array maintained for wavefront sensing is read out more rapidly than the majority of the detector array switched to iris imaging.

12. The method of claim 8, wherein imaging the iris with the majority of the detector array comprises integrating an iris image signal on the majority of the detector array.

13. A method of imaging an iris of an eye using an iris imaging system:
   sensing a wavefront of light reflecting from the eye using substantially all of a detector array;
   performing tip-tilt and focus correction based on the sensed wavefront of the light reflection from the eye;
   switching substantially all of the detector array from wavefront sensing to iris imaging;
   while maintaining a non-overlapping portion of the detector array for wavefront sensing:
   imaging the iris with substantially all of the detector array to obtain a first iris image:
   switching at least a portion of the detector array from iris-imaging to wavefront sensing;
   sensing the wavefront of light reflecting from the eye using the at least a portion of the detector array;
   correcting tip-tilt and focus aberrations based on the sensed wavefront of the light reflecting from the eye by the at least a portion of the detector array;
   switching the at least a portion of the detector array from wavefront sensing to iris imaging; and
   imaging the iris with substantially all of the detector array to obtain second iris image.

* * * * *

UNITED STATES PATENT AND TRADEMARK OFFICE
CERTIFICATE OF CORRECTION

PATENT NO. : 8,025,399 B2  
APPLICATION NO. : 12/021175  
DATED : September 27, 2011  
INVENTOR(S) : Malcolm J. Northcott et al.

Page 1 of 1

It is certified that error appears in the above-identified patent and that said Letters Patent is hereby corrected as shown below:

Column 8, line 58, after "to obtain", insert --a--.

Signed and Sealed this  
Twenty-ninth Day of November, 2011

David J. Kappos  
*Director of the United States Patent and Trademark Office*